United States Patent
Leen et al.

(10) Patent No.: US 11,867,623 B2
(45) Date of Patent: Jan. 9, 2024

(54) USE OF GRADIENT-INDEX LENSES FOR CAVITY ENHANCED ABSORPTION SPECTROSCOPY

(71) Applicant: ABB Schweiz AG, Baden (CH)

(72) Inventors: John B. Leen, Sunnyvale, CA (US); Dylan R. Rittman, Mountain View, CA (US); Kyle G Owen, Lompoc, CA (US); Douglas S. Baer, Menlo Park, CA (US)

(73) Assignee: ABB Schweiz AG, Baden (CH)

( * ) Notice: Subject to any disclaimer, the term of this patent is extended or adjusted under 35 U.S.C. 154(b) by 74 days.

(21) Appl. No.: 17/668,046

(22) Filed: Feb. 9, 2022

(65) Prior Publication Data
US 2023/0251191 A1    Aug. 10, 2023

(51) Int. Cl.
*G01N 21/39* (2006.01)
*G01N 21/3504* (2014.01)

(52) U.S. Cl.
CPC .......... *G01N 21/39* (2013.01); *G01N 21/3504* (2013.01); *G01N 2021/3509* (2013.01); *G01N 2021/391* (2013.01)

(58) Field of Classification Search
CPC ............... G01N 21/39; G01N 21/3504; G01N 2021/3509; G01N 2021/391
See application file for complete search history.

(56) References Cited

U.S. PATENT DOCUMENTS 4,844,574 A * 7/1989 Chande ................ B23K 26/073
385/39
7,768,647 B2    8/2010 Reeve et al.
2002/0146202 A1 * 10/2002 Reed ..................... A61B 5/0084
385/34
2013/0286397 A1    10/2013 Witinski et al.
2015/0377704 A1    12/2015 Cox
(Continued)

FOREIGN PATENT DOCUMENTS

CN    103604773 A  *  2/2014  ............. G01N 21/39

OTHER PUBLICATIONS

"H2S trace concentration measurements using off-axis integrated cavity output spectroscopy in the near-infrared", Applied Physics B—Lasers and Optics, 90, 311-315 (2008) by Chen et al. (Year: 2008).*

(Continued)

*Primary Examiner* — Jamil Ahmed
(74) *Attorney, Agent, or Firm* — Leydig, Voit & Mayer, Ltd.

(57) ABSTRACT

A cavity enhanced absorption spectroscopy (CEAS) system is provided that utilizes collimators the incorporate gradient index (GRIN) lenses in lieu of conventional spherical or aspheric refractive lenses. The use of smaller diameter GRIN lenses facilitates a reduced initial beam size entering the sample cavity, which reduces self-interference noise and increases a signal to noise ratio of the measurements. Further, a reduced size and mass of the GRIN lens can reduce a size of the mounting hardware utilized to mount the optical components, which enables more laser beams to be coupled to a single gas cell compared to a similar gas cell integrated with conventional refractive collimators. A larger number of lasers enables more gas peaks to be measured substantially simultaneously using the CEAS system.

15 Claims, 6 Drawing Sheets

(56) References Cited

U.S. PATENT DOCUMENTS

2018/0045561 A1      2/2018  Leen et al.
2018/0238794 A1*    8/2018  Kangas ............... G02B 3/0056

OTHER PUBLICATIONS

Chen et al., "H$_2$S trace concentration measurements using off-axis integrated cavity output spectroscopy in the near-infrared," *Applied Physics B*, 90(2): 311-315 (2008).

Riesen et al., "Graded-index fiber on-chip absorption spectroscopy," *Conference on Lasers and Electro-Optics (CLEO)*; 2 pp. (May 9-14, 2021).

Zheng et al., "Near-Infrared Off-Axis Integrated Cavity Output Spectroscopic Gas Sensor for Real-Time, In Situ Atmospheric Methane Monitoring," *IEEE Sensors Journal*, 21(5): 6830-8838 (Dec. 7, 2020).

European Patent Office, Extended European Search Report in European Patent Application No. 23155334.8, 9 pp. (Jun. 23, 2023).

* cited by examiner

USE OF GRADIENT-INDEX LENSES FOR CAVITY ENHANCED ABSORPTION SPECTROSCOPY

FIELD

The present disclosure relates to an apparatus for measuring gases included in a sample using cavity enhanced absorption spectroscopy (CEAS). More particularly, the present disclosure relates to a CEAS system that uses gradient-index (GRIN) lenses as an optical component of the CEAS system.

BACKGROUND

The ability to measure multiple gas species by CEAS is limited by a wavelength scanning range of the laser beam injected into the cavity. For CEAS implementations that do not require mode matching to the cavity, using multiple lasers, each laser operating at a different center wavelength, can help to overcome this limitation. However, the maximum number of lasers that can be included in the CEAS system is constrained due to the size of the lenses and their associated collimators and mounts. Larger lens size also increases the beam size, which increases self-interference of the laser beam as it reflects back and forth within the cavity.

Accurately measuring gas concentration using CEAS requires analyzing one or more absorption peaks, preferably measuring peaks that are well isolated from peaks related to other gases that may be present in the cavity. Furthermore, it is advantageous to have a single measurement cell that is capable of accurately measuring the concentration of multiple gases. It is often necessary to use multiple lasers such that the CEAS system includes the bandwidth necessary to measure well-isolated absorption peaks from multiple gases. The number of lasers able to be included in the cavity is limited by the ability to physically fit the lasers and their mounts into the CEAS system.

Current methods of solving this issue include offsetting the position of each of the lasers. However, the number of lasers could be increased even further if the sizes of the optical components, such as the collimators, were reduced. While it is possible to multiplex multiple source lasers using dichroic mirrors or fiber combiners that utilize wavelength division multiplexing, these approaches add additional cost to the system and may not work as well for laser beams of widely varying wavelengths.

In addition, self-interference of the laser beam as it propagates back and forth within the cavity contributes to the overall noise of the system. Although a typical CEAS system involves hundreds or thousands of reflections within the cavity for a single measurement, the first several reflections contribute disproportionately to self-interference noise because the beam has not yet diverged significantly. Current techniques for reducing self-interference include using collimators to minimize the size of the laser beam entering the cavity and to reduce divergence of the beam. However, there are practical constraints There is a need to solve these issues and/or other issues related to CEAS systems.

SUMMARY

A system, method, and apparatus are provided for performing cavity enhanced absorption spectroscopy (CEAS) to measure composition of a sample of gas. A CEAS system is provided that utilizes gradient index (GRIN) lens collimators in lieu of conventional spherical or aspheric refractive lens collimators. The use of smaller diameter GRIN lenses facilitates a reduced initial beam size entering the sample cavity, which reduces self-interference noise and increases a signal to noise ratio of the measurements. Further, a reduced size and mass of the GRIN lens can reduce a size of the collimator and mounting hardware utilized to mount the optical components, which enables more laser beams to be coupled to a single gas cell. A larger number of lasers enables more gas peaks to be measured substantially simultaneously using the CEAS system. In other embodiments, the GRIN lenses can be replaced with other small diameter lenses such as ball lenses or a microlens array.

In accordance with a first aspect of the present disclosure, a cavity enhanced absorption spectroscopy (CEAS) system is presented that includes: a gas cell enclosed by a first mirror on one end of the gas cell and a second mirror on the other end of the gas cell to form a cavity therein, and a plurality of optical component sub-units. Each optical component sub-unit includes at least a collimator and mounting hardware. The collimator operates to direct a laser beam into the cavity having an initial beam size less than 3 millimeters in diameter. Each optical component sub-unit is associated with a laser beam of a different wavelength.

In accordance with some embodiments of the first aspect, the initial beam size is less than 1.5 millimeters in diameter.

In accordance with some embodiments of the first aspect, each optical component sub-unit comprises a lens mounted within a tube of the collimator.

In accordance with some embodiments of the first aspect, the lens comprises a gradient index (GRIN) lens.

In accordance with some embodiments of the first aspect, the GRIN lens is a cylinder having a refractive index that varies in accordance with a distance from a central axis of the cylinder. A diameter of the GRIN lens is between 0.5 and 1.5 mm and a length of the GRIN lens is less than 5 mm.

In accordance with some embodiments of the first aspect, the lens comprises a ball lens made from a glass material and having a diameter of less than 3 mm.

In accordance with some embodiments of the first aspect, the lens comprises a microlens array that includes a plurality of lenslets, each lenslet having a diameter of less than 100 µm.

In accordance with some embodiments of the first aspect, a number of the plurality of optical component sub-units integrated into the CEAS system is at least four such that a minimum of four different peaks associated with a sample of gas in the cavity can be measured substantially simultaneously.

In accordance with some embodiments of the first aspect, the CEAS system further comprises a plurality of laser diodes, each laser diode producing a laser beam of a different wavelength. Each laser beam is routed to a particular optical component sub-unit via a fiber.

In accordance with a second aspect of the present disclosure, a cavity enhanced absorption spectroscopy (CEAS) system is presented that includes: a gas cell, and a plurality of optical component sub-units. Each optical component sub-unit includes a gradient index (GRIN) lens included in a collimator attached to a fiber. The GRIN lens and collimator operate to direct a laser beam into a cavity of the gas cell. The GRIN lens has a diameter of less than 3 millimeters. Each optical component sub-unit is associated with a laser beam of a different wavelength.

In accordance with some embodiments of the second aspect, an initial beam diameter of the laser beam entering the cavity is less than 1.5 millimeters.

In accordance with some embodiments of the second aspect, the GRIN lens is a cylinder having a refractive index that varies in accordance with a distance from a central axis of the cylinder. A diameter of the GRIN lens is between 0.5 and 1.5 mm, and a length of the GRIN lens is less than 5 mm.

In accordance with some embodiments of the second aspect, the collimator comprises a stainless steel collimation tube. The GRIN lens is positioned within the stainless steel collimation tube a distance from an end of the fiber equal to a focal length of the GRIN lens.

In accordance with some embodiments of the second aspect, a divergence angle of the laser beam is less than 1.5 degrees.

In accordance with some embodiments of the second aspect, each collimator of the plurality of optical component sub-units is attached to the CEAS system via corresponding mounting hardware.

DETAILED DESCRIPTION

Embodiments of the present disclosure provide a CEAS system that replaces conventional refractive lens collimators with a small diameter collimator, such as one incorporating a GRIN lens, which may be one half to one third of the size of the conventional optical components. Further, the smaller mass of the GRIN lens collimator allows for reduced size of the mounting structure associated with each laser, which allows a greater number of lasers to be included in the CEAS system compared to the same system using conventional spherical or aspherical collimators. The larger number of lasers permits more gas absorption peaks and gas species to be measured for a sample simultaneously.

The smaller GRIN lenses incorporated into the aforementioned collimators also decrease the initial beam size of the laser beam as it enters the cavity of the CEAS system, which reduces the noise caused by self-interference of the laser beam as it reflects back and forth within the cavity. Reducing the noise improves the standard deviation of the measured gas concentration values and can allow for operation of CEAS systems having smaller cell diameters with equivalent performance. Smaller cells means that smaller sample sizes can be measured without decreasing the signal to noise ratio of the measurement significantly.

Various embodiments of the present disclosure provide for collimators that incorporate other types of lenses to be used with the CEAS system in lieu of the GRIN lenses. For example, ball lenses having a diameter of less than 3 mm, and preferably between 0.5 mm and 1.5 mm, can be used with a smaller collimator tube and mounting hardware. The object of the embodiments disclosed herein is to minimize the size of the laser beam entering the cavity and employ a collimator that reduces the angle of divergence of said beam below a threshold value (e.g., 1 degree).

Figure 1:
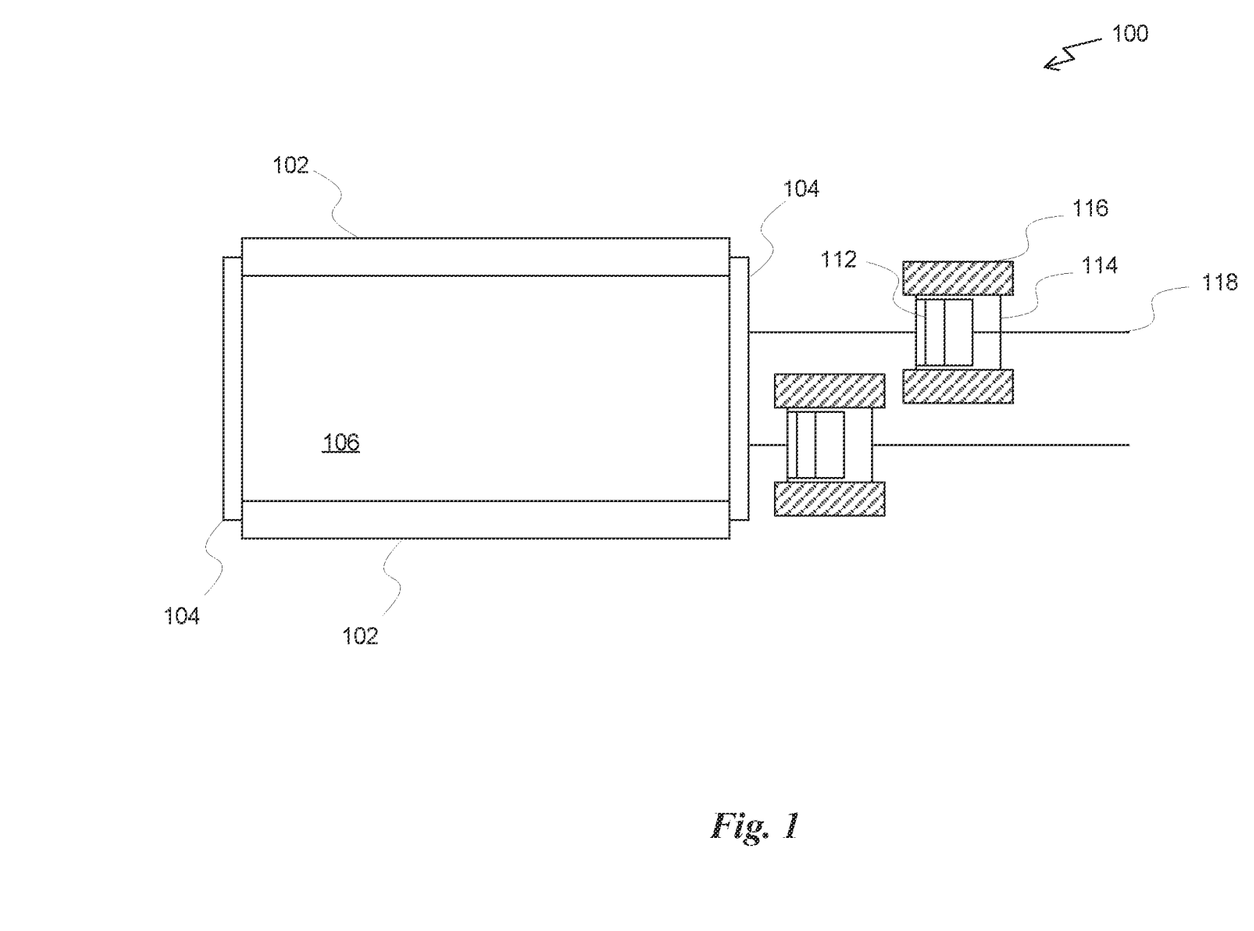
FIG. 1 illustrates a CEAS system for measuring a concentration level of gases, in accordance with the prior art.

FIG. 1 illustrates a CEAS system 100 for measuring a concentration level of gases, in accordance with the prior art. The system 100 includes a gas cell 102 enclosed by a pair of mirrors 104 at both ends of the cell 102. It will be appreciated that the gas cell 102 may be a circular tube such that the gas cell 102 forms a cylindrical cavity 106 that encloses a sample of gas to be measured. It will be appreciated that the gas cell 102 does not have to be cylindrical, as rectangular tubes or tubes of any other cross-sectional shape may be used as well.

The CEAS system 100 measures the gas concentration in the cavity by injecting one or more laser beams 110 into the cavity. Each laser beam travels the length of the cavity 106 and is reflected off the far mirror 104, where the laser beam then travels back through the cavity 106 to the opposite mirror 104. By injecting the laser beam at a slight angle relative to a central longitudinal axis of the gas cell 102, the laser beam may reflect back and forth off the mirrors 104 a large number of times before hitting a sensor (not explicitly shown) that measures the light intensity of the laser beam. The resulting measurement can determine how much light of the laser beam is absorbed within the cavity 106 while the laser beam has traveled back and forth due to the reflections off the opposing mirrors 104.

As shown in FIG. 1, the conventional CEAS system includes optical components for each of two or more laser beams. The optical components for each laser beam may include a collimator 114 and mounting hardware 116. In an embodiment, the collimator 114 includes a lens 112, such as a conventional convex spherical or aspherical lens. In some embodiments, the laser beam can be generated by a laser diode and routed toward the optical components via a laser fiber 118. The laser beam exits the laser fiber 118, and then passes through the lens 112 of the collimator 114 to reduce the divergence of the laser beam, before entering the cavity 106.

Importantly, light exiting the fiber will diverge as a cone of light (e.g., common fiber types have a full emission angle between 25 and 80 degrees, approximately). The operating principle of the collimator 114 is such that the end of the fiber 118 should be placed at a distance from the lens 112 equal to the focal length of the lens 112. With an ideal lens, a point light source located a distance from the lens equal to the focal length of the lens would result in a parallel beam being emitted on the other side of the lens, with a beam size equal to the diameter of the lens. However, the fiber 118 has a non-zero diameter d and, therefore, the light exiting the fiber acts like an area light source rather than a point light source. The collimated beam from an area light source will have some divergence referred to as an angle of divergence, which can be calculated based on the focal length of the lens and the diameter of the fiber core.

Decreasing the angle of divergence requires decreasing the ratio of core diameter to focal length. Given a fixed size core diameter, reducing the angle of divergence requires increasing the focal length of the lens. Increasing the focal length of the lens, however, requires increasing the diameter of the lens in order to not reduce the power of the beam exiting the collimator because the angle of the cone of light exiting the fiber is constant, and the end of the fiber must be moved further from the lens in order to place the end of the fiber at the proper distance to result in a collimated beam of light. The further the lens is placed from the fiber, the bigger the diameter of the lens required to intersect the entire cone of light exiting the fiber. Consequently, reducing the beam size while keeping the angle of divergence below a threshold value without significantly reducing a power of the laser beam may be difficult with conventional spherical or aspherical lenses.

Figure 2:
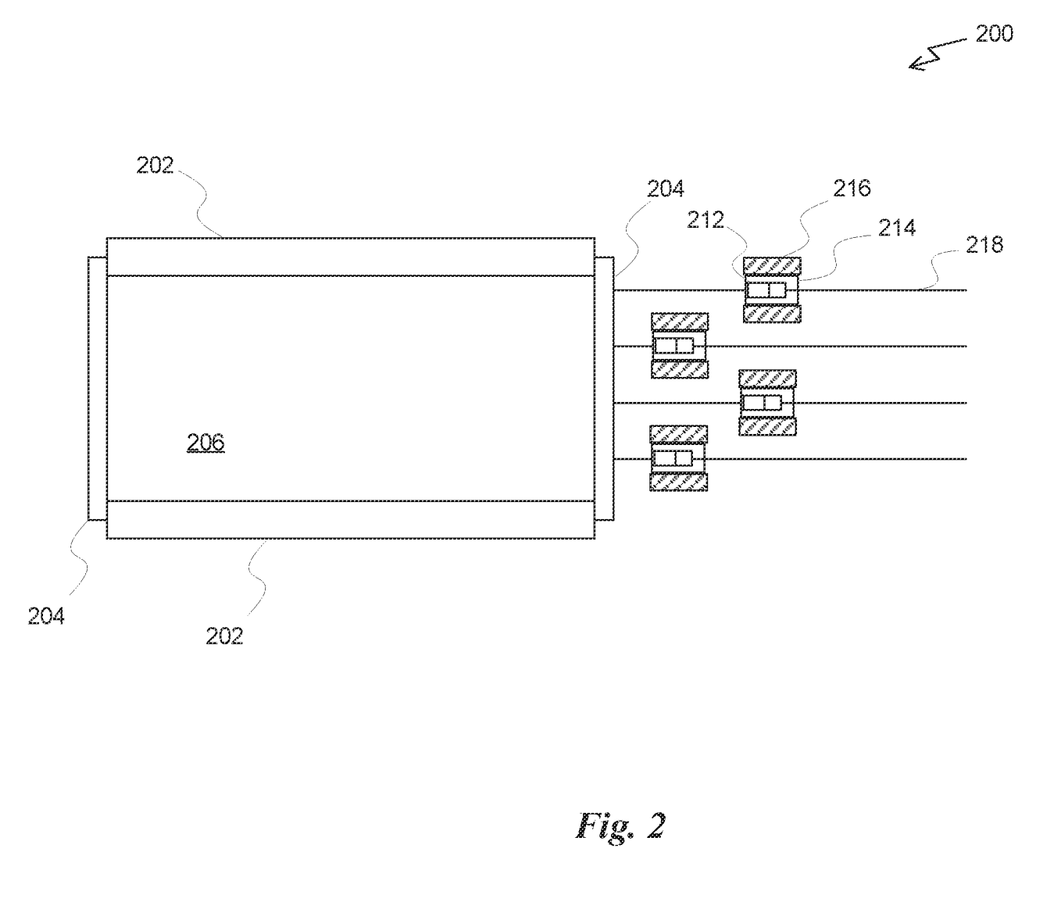
FIG. 2 illustrates a CEAS system for measuring a concentration level of gases, in accordance with an embodiment of the present disclosure.

FIG. 2 illustrates a CEAS system 200 for measuring a concentration level of gases, in accordance with an embodiment of the present disclosure. The system 200 includes a gas cell 202 enclosed by a pair of mirrors 204 at both ends of the gas cell 202. The gas cell 202 is similar to gas cell 102 and, together with mirrors 204, forms a cylindrical cavity 206 that encloses a sample of gas to be measured.

The CEAS system 200 includes optical components for each of two or more laser beams. The optical components for each laser beam include a collimator 214 and mounting hardware 216. The collimator 214 incorporates a GRIN lens 212 rather than a traditional spherical lens. In an embodiment, the laser beam can be generated by a laser diode and routed toward the optical components via a laser fiber 218, similar to the CEAS system 100. The laser beam exits the laser fiber 218, passes through the collimator 214 to reduce the divergence of the laser beam, and then enters the cavity 206. In an embodiment, the mounting hardware 216 can include an adapter that is configured to secure a tube of the collimator 214 that houses the GRIN lens 212. The mounting hardware may properly position the laser at the proper location and angle for the laser beam to enter the cavity 206.

In some embodiments, the GRIN lens 212 can be disposed in a collimation tube (e.g., a metal tube such as stainless steel) such that the end of the fiber 218 is located a fixed distance (e.g., equal to the focal length of the lens 212) from the lens 212. The mounting hardware 216 may be configured to be rigidly attached to a structure attached to the gas cell 202. For example, a cap attached to a tube of the gas cell 202 may include a plurality of ports that are designed to mate with the collimation tube of the collimator 214. Alternatively, an adapter may be configured to mate to the collimation tube and then be affixed or otherwise secured to a corresponding port in the cap. Of course, any hardware for mounting the optical components at a particular location and/or off-axis angle relative to a central axis of the gas cell 202 is within the scope of the present disclosure.

The GRIN lens 212 has a gradient profile such that a refractive index of the lens varies in a direction perpendicular to the optical axis of the lens. In an embodiment, the refractive index varies according to the following equation:

$$N = N_0[1 - (k/2)r^2],\qquad\text{(Eq. 1)}$$

where $N_0$ is a base refractive index corresponding to the center of the lens, k is a gradient constant, and r is a radius variable that represents a distance from the center of the lens. In one embodiment, the GRIN lens 212 is cylindrical, with a diameter between 0.5 mm-3 mm, which is typically smaller than a diameter of conventional spherical or aspheric lenses (e.g., plano-convex or bi-convex) that may start at 5 mm or more in diameter. For example, it may be difficult to grind and/or polish (or mold from a polymer material) a spherical or aspheric lens at small sizes (e.g., diameters) with the appropriate focal length, and/or conventional spherical or aspheric lens below, e.g., 5 mm in diameter may not be available commercially at low cost and/or produced without custom equipment. Comparatively, a GRIN lens that is commonly commercially available at lower cost may be ~1.0 mm in diameter and, e.g., ~4.0 mm in length.

Comparing CEAS system 100 to CEAS system 200, including similarly sized cavities 106/206, it can be possible to increase the number of laser beams used in the system by, e.g., two or more times. In the example illustrated in FIG. 2, the CEAS system 200 includes four sets of optical components for four laser beams compared to only two laser beams in the CEAS system 100 illustrated in FIG. 1. In other words, the smaller size of the GRIN lens 212, and the associated collimators 214 and mounting hardware 216, permits more laser beams to be used in the same system compared to conventional spherical or aspheric lenses.

In CEAS system 200, the laser beams (e.g., the optical components including the collimator 214 and mounting hardware 216) are disposed in locations offset from a central axis of the gas cell 202 in order to maximize the number of laser beams utilized with the system 200. It will be appreciated that although the components of FIG. 2 are shown in a two-dimensional arrangement, the offset location may be implemented in three-dimensions as well. For example, six laser beams may be offset at the vertices of a hexagon centered on the central axis. In some cases, a seventh laser beam can be positioned on the central axis. The optical components may be offset in a direction of the central axis such that there can be at least some overlap between the optical components in a radial direction in order to position the laser beams closer together. It will be appreciated that the number of laser beams and a position of each laser beam in a radial direction may be limited by the size and structure of the gas cell 202.

Figure 3:
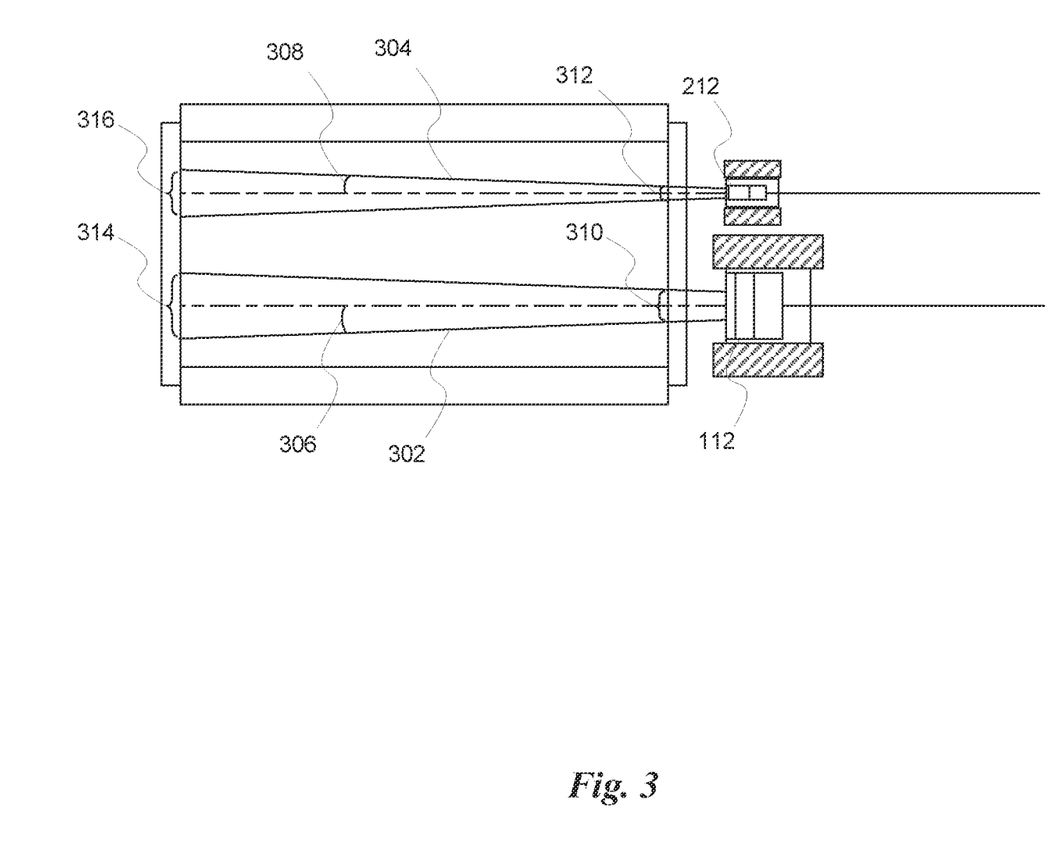
FIG. 3 conceptually illustrates the importance of reducing a beam size for the laser beam of CEAS system, in accordance with one embodiment of the present disclosure.

FIG. 3 conceptually illustrates the importance of reducing a beam size for the laser beam of CEAS system 200, in accordance with one embodiment of the present disclosure. The conventional lens 112 has a larger diameter (e.g., 5-10 mm) and produces a laser beam 302 with a larger initial beam size ($w_0$) 310 as the laser beam enters the cavity 106/206 compared with a GRIN lens 212 that has a smaller diameter (e.g., 0.5-3 mm) and produces a laser beam 304 with a smaller initial beam size ($w_0$) 312 as the laser beam enters the cavity 106/206. As used herein, a laser beam refers to a beam of light generated by a laser (e.g., a laser diode associated with a particular wavelength), where the beam of light has been directed through one or more optical components, such as a fiber and collimator, to focus and/or direct the beam of light along a substantially axial path. The beam of light is associated with a divergence angle ($\theta_D$) that represents a measure of divergence of light from the axial path. The divergence angle ($\theta_D$) 306 for the conventional lens 112 may be the same as the divergence angle ($\theta_D$) 308 for the GRIN lens 212. In addition, the length of travel L for the two laser beams 302, 304 can be the same assuming the direction and number of reflections for both laser beams within the cavity can be the same.

It will be appreciated that the total beam size ($w_B$) for the beam is a function of the initial beam size ($w_0$) plus a beam size due to divergence ($W_D$) given as:

$$w_B = w_0 + w_D.\qquad\text{(Eq. 2)}$$

where $w_D$ is based on a function of the divergence angle $\theta_D$ and length of travel L, which are the same for both the conventional lens 112 and the GRIN lens 212. Thus, the total beam size at any point of travel is dictated based on the initial beam size $w_0$. As shown, a total beam size 314 of the laser beam 302 is larger than a total beam size 316 of the laser beam 304 at the other end of the cavity 106/206. The smaller total beam size 316 associated with the GRIN lens 212 is beneficial to reducing the noise in the signal due to self-interference.

Figure 4A:
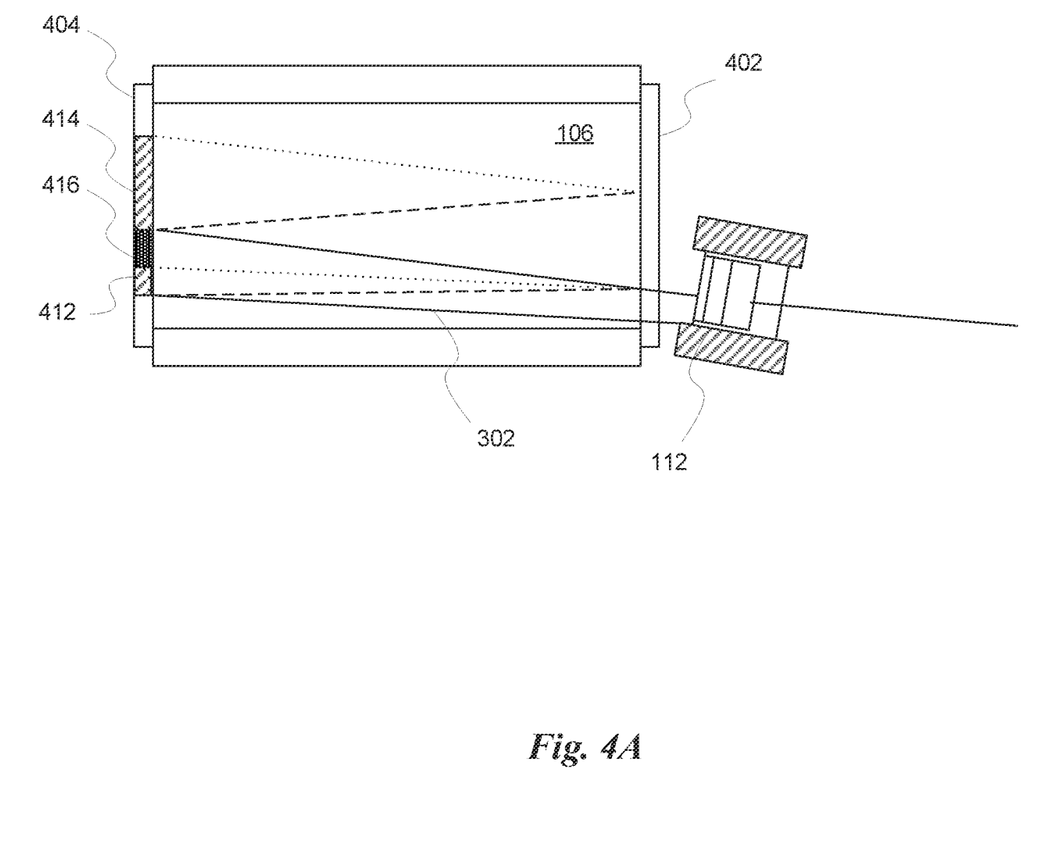
FIGS. 4A-4B illustrate a concept of reducing self-interference based on reducing the initial beam size of the laser beam entering the cavity, in accordance with an embodiment of the present disclosure.
Figure 4B:
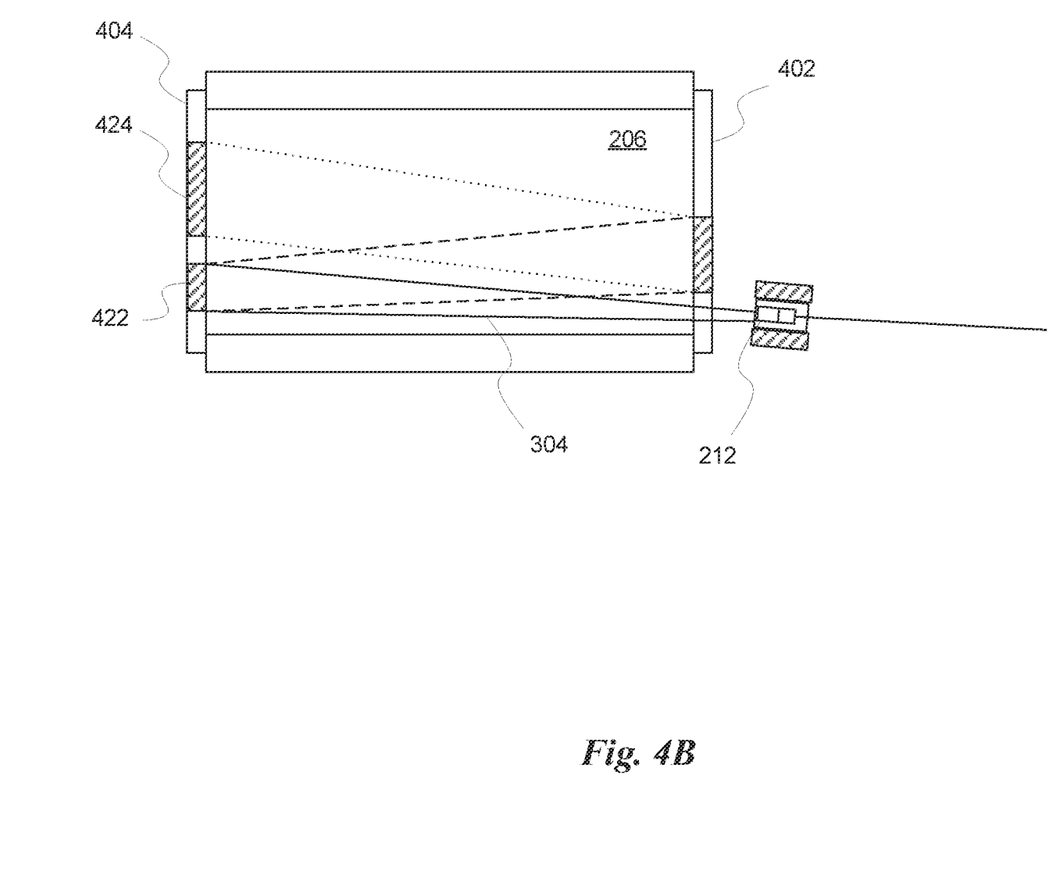

FIGS. 4A-4B illustrate a concept of reducing self-interference based on reducing the initial beam size of the laser beam entering the cavity 106, in accordance with an embodiment of the present disclosure. As depicted in FIG. 4A, a laser beam 302 from a conventional lens 112 enters a first end 402 of the cavity 106. The direction of the laser beam is not normal to the ends of the cavity 106 and, therefore, the laser beam reflects off the second end 404 of the cavity 106 and travels back through the cavity 106 to the first end 402.

It will be appreciated that the size (e.g., diameter) of the laser beam increases due to the angle of divergence as the laser beam travels from one end of the cavity to the other. The size of the laser beam across its initial travel across the cavity 106 is shown with continuous lines, the size of the laser beam as it travels back across the cavity 106 after the first reflection is shown with dashed lines, and the size of the laser beam as it travels back across the cavity 106 after the second reflection is shown with dotted lines.

An area of incidence of the laser beam 302 on the second end 404 during the first reflection is shown as area 412, and an area of incidence of the laser beam 302 on the second end 404 during the second reflection is shown as area 414. Because area 412 overlaps with area 414, there is an area of self-interference 416 where light from the first reflection interferes with light from the second reflection due to the overlapping of areas 412 and 414.

It will be appreciated that the larger the initial beam size that enters the cavity 106, the worse the self-interference. Interference can be reduced by changing the angle of the laser beam as it enters the cavity 106, but this can reduce the number of reflections that are possible within the cavity before the light hits the far wall of the cavity 106 and reflects back across the chamber, which could cause increased interference that objectively negates the benefits of increasing the angle to begin with. Further, increasing the angle and, thereby, decreasing the total number of reflections and total length traveled prior to measuring the light intensity with a sensor can decrease the total signal to noise ratio of the measurement.

As depicted in FIG. 4B, a laser beam 304 from a GRIN lens 212 enters a first end 402 of the cavity 106. The direction of the laser beam is not normal to the ends of the cavity 106 and, therefore, the laser beam reflects off the second end 404 of the cavity 206 and travels back through the cavity 206 to the first end 402. The direction of the laser beam 304 is the same as the direction of the laser beam 302 of FIG. 4A.

However, due to the smaller initial beam size of the laser beam 304, even with the same angle of divergence, we observe that there is no longer any self-interference at the second end of the cavity 206. More particularly, an area of incidence of the laser beam 304 on the second end 404 during the first reflection is shown as area 422, and an area of incidence of the laser beam 304 on the second end 404 during the second reflection is shown as area 424. Because area 422 does not overlap with area 424, there is no area of self-interference such as that shown in FIG. 4A.

Another benefit to using a laser beam with smaller initial size is that the initial angle of the laser beam entering the cavity 106 can be steeper, enabling more reflections within the cavity and longer travel distance without causing significant self-interference such as would occur with a larger initial beam size. As such, the signal to noise ratio of the measurement can be increased compared to that of the CEAS system 100 implemented with conventional spherical lenses 112.

In various embodiments, other types of small diameter lenses may be used in lieu of the GRIN lenses described above. For example, ball lenses, half-ball lenses, and micro lens arrays may be used so long as the initial beam size and angle of divergence are below a threshold value.

Figure 5A:
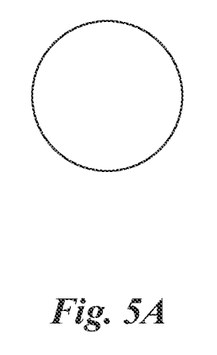
FIGS. 5A and 5B illustrate a ball lens, in front and side views, respectively, in accordance with one embodiment of the present disclosure.
Figure 5B:
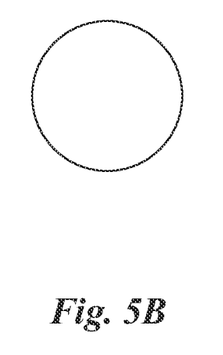

FIGS. 5A and 5B illustrate a ball lens 500, in front and side views, respectively, in accordance with one embodiment of the present disclosure. A ball lens 500 may be used, in some embodiments, in the collimator 214 in lieu of the GRIN lens 212. Ball lenses are used in fiber coupling and laser diodes and have a typical size in the range of 0.5 to 5 mm, which makes them suitable for producing a laser beam with reduced initial size compared to conventional spherical or aspheric lenses.

Figure 6A:
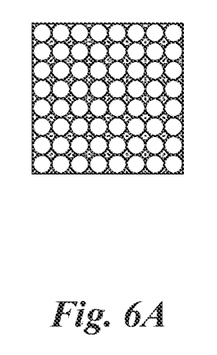
FIGS. 6A and 6B illustrate a microlens array, in front and side views, respectively, in accordance with one embodiment of the present disclosure.
Figure 6B:
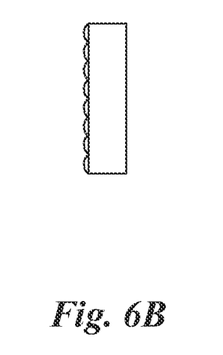

FIGS. 6A and 6B illustrate a microlens array 600, in front and side views, respectively, in accordance with one embodiment of the present disclosure. A microlens array 600 may be used, in other embodiments, in the collimator 214 in lieu of the GRIN lens 212. A microlens array 600 includes a plurality of micro lenses, sometimes referred to as lenslets, that have a diameter of tens or hundreds of micrometers. Therefore, a large number of micro lenses can be included in a microlens array 600 of minimal size, such as 1 mm in width and/or height.

It will be appreciated that, although the lenslets are shown as circles in FIG. 6A, the actual shape of lenslets is typically square or hexagonal with a curved (e.g., convex) surface disposed on a front surface of the lenslet, and the lenslets depicted in FIG. 6B may not be shown to scale. It will also be appreciated that the microlens array 600 shown in FIG. 6A is square in shape, although other shapes are contemplated as within the scope of the various embodiments of the present disclosure.

Other types of lenses may also be suitable for use in the collimator 214 such as micro-machined integrated fiber lenses.

It will be appreciated that a primary benefit of the various lenses described herein (e.g., GRIN lenses, ball lenses, and microlens arrays) is that the smaller size of the lenses can reduce the initial beam size of the laser beam entering the cavity 206 of the gas chamber 202. The reduced size of the optical components, such as the collimator 214 and mounting hardware 216, can also enable a larger number of lasers to be implemented in a single CEAS system 200 compared to a convention CEAS system 100 of similar cavity size. This enables more peaks to be measured for different wavelengths substantially simultaneously, and also increases the signal to noise ratio of the measurements by reducing self-interference within the cavity 206.

Another secondary benefit of the described lenses is that a reduced mass of the lenses can reduce a size of the mounting hardware 216 required to maintain sufficient rigidity requirements for high-shock and vibration environments.

It should be understood that the arrangement of components illustrated in the attached Figures are for illustrative purposes and that other arrangements are possible. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A cavity enhanced absorption spectroscopy (CEAS) system, comprising:
   a gas cell enclosed by a first mirror on one end of the gas cell and a second mirror on the other end of the gas cell to form a cavity therein; and
   a plurality of optical component sub-units, each respective optical component sub-unit including at least a collimator and mounting hardware, wherein the collimator operates to direct a respective laser beam into the cavity having an initial beam size less than 3 millimeters in diameter, wherein each optical component sub-unit is associated with a laser beam of a different wavelength, and wherein the plurality of optical component sub-units are disposed in locations offset from each other in a direction away from a central axis of the gas cell, so that the plurality of laser beams directed by the plurality of optical component sub-units into the cavity are offset from each other in the direction away from the central axis of the gas cell.

2. The CEAS system of claim 1, wherein the initial beam size is less than 1.5 millimeters in diameter.

3. The CEAS system of claim 1, wherein each optical component sub-unit comprises a lens mounted within a tube of the collimator.

4. The CEAS system of claim 3, wherein the lens comprises a gradient index (GRIN) lens.

5. The CEAS system of claim 4, wherein the GRIN lens is a cylinder having a refractive index that varies in accordance with a distance from a central axis of the cylinder, and wherein a diameter of the GRIN lens is between 0.5 and 1.5 mm and a length of the GRIN lens is less than 5 mm.

6. The CEAS system of claim 3 wherein the lens comprises a ball lens made from a glass material and having a diameter of less than 3 mm.

7. The CEAS system of claim 3, wherein the lens comprises a microlens array that includes a plurality of lenslets, each lenslet having a diameter of less than 100 µm.

8. The CEAS system of claim 1, wherein a number of the plurality of optical component sub-units integrated into the CEAS system is at least four such that a minimum of four different peaks associated with a sample of gas in the cavity can be measured substantially simultaneously.

9. The CEAS system of claim 1, wherein the CEAS system further comprises a plurality of laser diodes, each laser diode producing the respective laser beam of the different wavelength, and wherein each laser beam is routed to a particular optical component sub-unit via a fiber.

10. A cavity enhanced absorption spectroscopy (CEAS) system, comprising:
    a gas cell; and
    a plurality of optical component sub-units, each respective optical component sub-unit including a respective gradient index (GRIN) lens included in a respective collimator attached to a respective fiber, wherein the respective GRIN lens and the respective collimator operate to direct a respective laser beam into a cavity of the gas cell, wherein the respective GRIN lens has a diameter of less than 3 millimeters, wherein each respective optical component sub-unit is associated with a respective laser beam of a different wavelength, and wherein the plurality of optical component sub-units are disposed in locations offset from each other in a direction away from a central axis of the gas cell, so that the plurality of laser beams directed by the plurality of optical component sub-units into the cavity are offset from each other in the direction away from the central axis of the gas cell.

11. The CEAS system of claim 10, wherein an initial beam diameter of the laser beam entering the cavity is less than 1.5 millimeters.

12. The CEAS system of claim 10, wherein the GRIN lens is a cylinder having a refractive index that varies in accordance with a distance from a central axis of the cylinder, and wherein a diameter of the GRIN lens is between 0.5 and 1.5 mm and a length of the GRIN lens is less than 5 mm.

13. The CEAS system of claim 10, wherein the collimator comprises a stainless steel collimation tube, and wherein the GRIN lens is positioned within the stainless steel collimation tube at a distance from an end of the fiber equal to a focal length of the GRIN lens.

14. The CEAS system of claim 10, wherein a divergence angle of the laser beam is less than 1.5 degrees.

15. The CEAS system of claim 10, wherein each collimator of the plurality of optical component sub-units is attached to the CEAS system via corresponding mounting hardware.

* * * * *